United States Patent [19]

Majeed

[11] Patent Number: 5,062,658
[45] Date of Patent: Nov. 5, 1991

[54] VEHICLE SUSPENSION CONTROL WITH REAL TIME GAIN SWITCHING

[75] Inventor: Kamal N. Majeed, Centerville, Ohio

[73] Assignee: General Motors Corporation, Detroit, Mich.

[21] Appl. No.: 614,894

[22] Filed: Nov. 16, 1990

Related U.S. Application Data

[63] Continuation-in-part of Ser. No. 430,859, Nov. 2, 1989, abandoned.

[51] Int. Cl.$^5$ .............................................. B60G 17/08
[52] U.S. Cl. ................................ 280/707; 364/424.05
[58] Field of Search ............... 280/702, 707, 709, 714; 364/424.05

[56] References Cited

U.S. PATENT DOCUMENTS

| | | | |
|---|---|---|---|
| 3,807,678 | 4/1974 | Karnopp | 248/562 |
| 4,589,676 | 5/1986 | Meloche et al. | 280/707 |
| 4,625,993 | 12/1986 | Williams et al. | 280/707 |
| 4,696,489 | 9/1987 | Fujishiro et al. | 280/707 |
| 4,770,438 | 9/1988 | Sugasawa et al. | 280/207 |
| 4,779,895 | 10/1988 | Rubel | 280/707 |

FOREIGN PATENT DOCUMENTS 1-11515  4/1989  Japan .................................. 280/707

OTHER PUBLICATIONS

Karnopp, "Active Damping in Road Vehicle Suspension Systems", *Vehicle System Dynamics*, vol. 12, pp. 291-311, 1983.

Crosby and Karnopp, "The active Damper-A New Concept for Shock and Vibration Control", *43rd Shock and Vibration Bulletin*, Shock and Vibration Information Center, Naval Research Laboratory, Washington, DC, 1973, pp. 119-133.

Krasnickl, "Comparison of Analytic and Expermental Results for a Semi-Active Vibration Isolator", *Proceedings of the 50th Shock and Vibration Symposium*, Oct. 1979, pp. 69-76.

Margolis, "Semi Active Control of Wheelhop in Ground Vehicles", *Vehicle System Dynamics*, vol. 12, pp. 317-330, 1983.

*Physics for Students of Science and Engineering*, Halliday and Resnick, John Wiley and Sons, 1960, 1962, pp. 121-122.

*Primary Examiner*—Charles A. Marmor
*Assistant Examiner*—Tamara L. Finlay
*Attorney, Agent, or Firm*—Robert M. Sigler

[57] ABSTRACT

Suspension apparatus provides a real time suspension tuning control for a motor vehicle. An actuator is connected to exert a variable force between the vehicle body and wheel. A control derives a control signal for the actuator from a linear combination of vehicle state variables derived from sensed vehicle variables, the linear combination being characterized by gains determining the relative contribution of each state variable to the control signal. The control further stores in memory a plurality of alternatives sets of gains, with each stored set of gains comprising gain values tending to produce a different suspension performance. The control is responsive to one of the sensed vehicle varibles in real time to select between the alternative sets of gains in deriving the control signal. The suspension tuning characteristics are thus easily and quickly changed in emphasis between isolation, wheel control and body attitude control in real time vehicle operation.

7 Claims, 7 Drawing Sheets

FIG.1

DAMPING FORCE-VELOCITY DIAGRAM

VEHICLE SUSPENSION CONTROL WITH REAL TIME GAIN SWITCHING

BACKGROUND OF THE INVENTION

This is a continuation-in-part of U.S. Ser. No. 07/430,859, filed Nov. 2, 1989 abandoned.

This invention relates to a controlled vehicle suspensions, and particularly to such a suspension in which an actuator is controlled in real time to exert a variable force between the vehicle body and wheel. In particular, this invention provides real time control of vehicle suspension tuning in vehicle operation.

In active or semi-active controlled suspensions, an actuator force may be controlled in response to control signals derived as linear combinations of one or more state variable signals, which are themselves derived from sensed vehicle variables. Such linear controls are characterized by gains determining the relative contribution of each state variable to each output force. Various combinations or sets of gains can be developed to produce suspension controls which emphasize different suspension performance qualities. For example, a first set of gains could emphasize isolation of the body from the road surface to produce a soft, comfortable ride. A second set of gains could emphasize wheel control to provide exceptional traction on rough roads. Yet another set of gains could emphasize body control to maintain body attitude during vehicle turns, acceleration and deceleration. The precise values of the gains differ for each set and are dictated by the physics of the vehicle in view of the desired vehicle suspension behavior.

It has long been known by those skilled in the art of vehicle suspension design that these desirable ride and handling goals are not simultaneously maximized in any suspension of fixed characteristics; and designers have therefore been forced to produce compromise suspension designs. This limits the degree to which any of the ride and handling quality goals may be met.

The prior art has shown damper systems which respond to sensed road profile to change the dampers between firm and soft settings. However, these systems use dampers having variable orifice members which must be physically moved among various positions, with inertia, friction and, often, the necessity to move against a high fluid pressure providing delays in response. In addition, the controls of these systems, when they respond to road inputs, choose damper settings on the basis of road profiles generated from an average of road input over time. Those systems which respond more quickly to stop and turn signals to maintain body attitude provided a fixed control algorithm. In addition, the range of possible suspension control of such systems is generally limited to switching between a few fixed damper settings, which are held for a significant time until a new road profile could be determined.

SUMMARY OF THE INVENTION

If a vehicle suspension can be given different characteristics by different sets of gains stored in memory, then vehicle suspension tuning can be software controlled in real time vehicle operation by a control which switches between alternative sets of gains. This invention is such a vehicle suspension for a motor vehicle having a body suspended by suspension springs at a plurality of points on unsprung, road contacting wheels. The suspension comprises an actuator connected to exert a variable force between the vehicle body and one of the wheels in response to a control signal. A control is effective to derive the control signal for the actuator from a linear combination of vehicle state variables derived from sensed vehicle variables, the linear combination being characterized by gains determining the relative contribution of each state variable to the control signal. The control includes a memory which stores a plurality of alternative sets of gains for use in deriving the control signal, each stored set of gains comprising gain values tending to produce a different suspension performance. The control further comprises means responsive to one of the sensed vehicle variables in real time to select between the alternative sets of gains in deriving the control signal.

The control may normally use a set of isolation gains until the vehicle encounters a road profile that degrades tire control, whereupon the control can be instantly switched to wheel gains to emphasize wheel control. When the road again becomes smooth, the control can be switched back to the isolation gains. The system of this invention is capable of sensing and requesting such changes within a single one millisecond control loop and generating a wide variety of software controlled suspension tunings or behaviors with the use of active actuators, continuously variable dampers or on/off dampers.

DESCRIPTION OF THE PREFERRED EMBODIMENT

Figure 1:
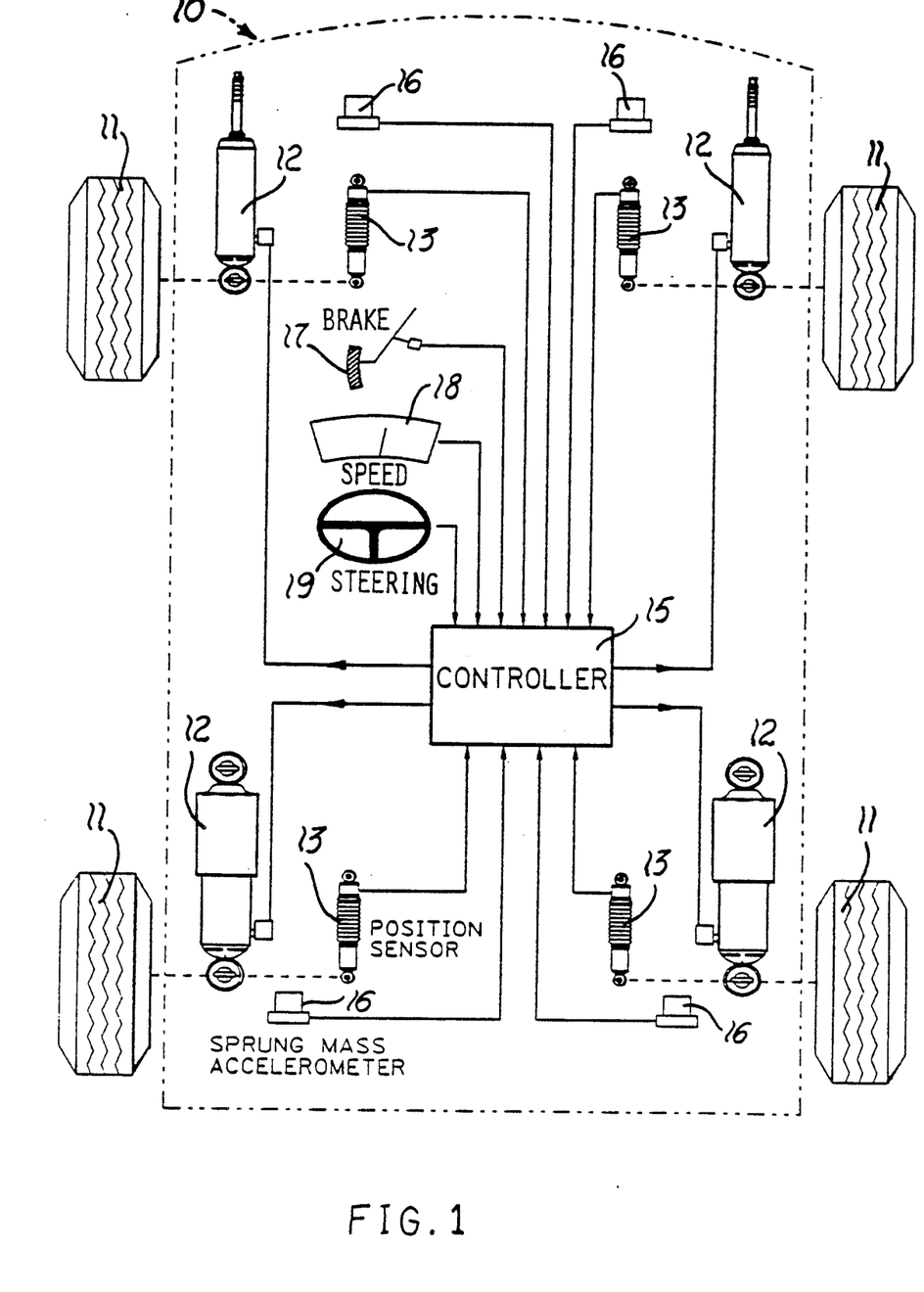
FIG. 1 is a schematic diagram of a motor vehicle with a suspension control according to this invention.

FIG. 1 shows a schematic diagram of a motor vehicle with a suspension control according to the invention. The vehicle has a body 10 comprising a sprung mass. Body 10 is essentially rectangular in shape and is supported on a wheel 11 at suspension points comprising each of its corners by suspension apparatus 12 comprising a weight bearing suspension spring in parallel with a suspension actuator connected to exert a controllable force in parallel with the spring between the body 10 and wheel 11 at that suspension point. The suspension actuator may be a hydraulic or electric actuator capable of providing power to the suspension, as used in a fully active suspension control. Alternatively, the actuator may be a variable damper, which is capable only of dissipating power, as used in a semi-active suspension control, or a variable spring. If a variable damper, it may provide damping control in either a continuous or a discrete manner. In FIG. 1, apparatus 12 is shown as a damper for simplicity, although it is understood that a spring, such as a standard coil suspension spring, is connected in parallel with it. Suspension apparatus 12 further includes an axle for rotatably supporting wheel 11 and such other suspension components, such as control arms, as are required for and comprise the unsprung mass of a standard vehicle suspension. These components are also omitted from separate view in FIG. 1 for simplicity.

At each corner of body 10, a suspension position sensor 13 is connected between the body and unsprung masses to measure the relative vertical position thereof and generate an output vertical suspension position signal for input to a controller 15. An LVDT position sensor is suitable for this purpose; and such a sensor is available from, among others, Nartron Corporation of Reed City, MI. The relative vertical suspension position signal may be differentiated to produce a relative body/wheel vertical velocity signal. An acceleration sensor 16 is also positioned at each corner of body 10; and sensor 16 generates an absolute vertical acceleration signal of that corner of body 10 for input to controller 15. For each corner of the vehicle, integration of the absolute vertical acceleration signal from sensor 16 by controller 15 provides a vertical body corner velocity signal. From the difference of these signals, controller 15 is able to compute the vertical wheel velocity. An absolute acceleration sensor suitable for use in this system is made by First Inertia Corporation of Hampshire, England. Acceleration sensors 16 should be mounted with care so as to minimize cross-axis sensitivity which might contaminate the vertical acceleration signal with horizontal acceleration information. Additional signals which may optionally be generated are a vehicle deceleration or braking signal by brake sensor 17, a vehicle speed signal from vehicle speed sensor 18 and a vehicle steering signal from vehicle steering sensor 19. These latter signals are not required for the suspension control of this invention and will not be further described. However, many examples of such sensors and their uses for suspension control are known in the prior art.

As already mentioned, the suspension control of this invention may be applied to a fully active suspension using a hydraulic, electric or other power generating actuator, a continuously variable damper, or a discrete variable damper. The suspension control described in this embodiment is an on/off semi-active control using an actuator 20 comprising a dual force/velocity curve, discrete variable damper, shown in more detail in FIG. 2. Actuator or damper 20 is a standard vehicle shock or strut modified by the addition of a bypass passage which can be opened or closed by a bypass valve capable of high frequency operation for real time, on/off damping control. With the bypass valve open, the damper has a low damping force curve such as curve 21 in FIG. 3; and, with the bypass valve closed, the damper has a high damping force curve, such as curve 22 of FIG. 3.

Figures 2, 3:
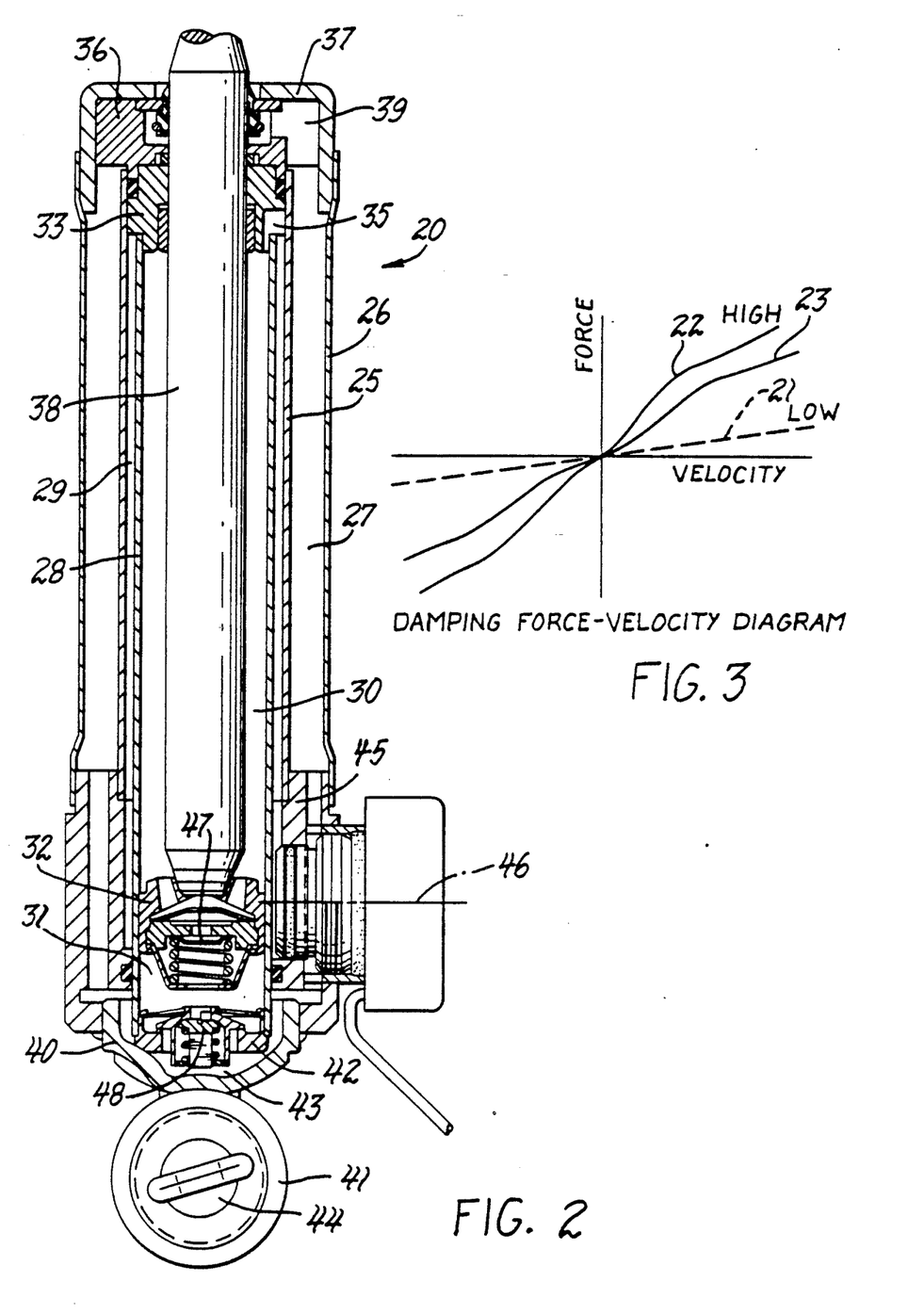
FIG. 2 is a cross sectional view of a suspension actuator for use in the suspension control of the vehicle of FIG. 1.
FIG. 3 is a typical set of force/velocity curves for the suspension actuator of FIG. 2.

Referring to FIG. 2, variable damper 20 comprises inner and outer reservoir tubes 25 and 26, respectively, defining therebetween a reservoir 27. A central pressure cylinder 28 is located axially within inner reservoir tube 25 and defines with it an annular passage 29. The space within central pressure cylinder 28 is divided into upper and lower chambers 30 and 31, respectively, by a piston 32 sealingly disposed for axial movement. Upper chamber 30 and annular passage 29 are bounded at their upper ends by a pressure closure member 33 which provides relatively unrestricted communication between chamber 30 and passage 29 through an opening 35. Reservoir 27 is bounded at its upper end by a reservoir closure member 36 and an upper end cap 37.

Piston 32 is attached to the lower end of a reciprocating piston rod 38, which extends upward through openings in members 33, 36 and end cap 37 for attachment to a corner of body 10 in the manner normal for shocks or struts. High pressure and lag seals are provided in members 33 and 36, respectively; and a lower pressure seal is provided in end cap 37 around piston rod 38. Since there will be some fluid leakage past the high pressure and lag seals, a return passage 39 is provided through reservoir closure member 36 to reservoir 27.

The lower end of damper 20 comprises an outer closure cap 40 rigidly attached to reservoir tubes 25 and 26 and pressure cylinder 28 and connected in the normal manner to a member of the unsprung mass of the vehicle such as a control arm 44 by means of a standard fitting 41. An inner closure cap 42 closes the bottom of lower chamber 31 and defines a lower reservoir chamber 43 between closure caps 40 and 42 which is open to reservoir 27. A lower closure member 45 bounds the lower end of reservoir 27 and annular passage 29 and further provides mounting for an electrically activated bypass valve apparatus 46, which controls communication between annular passage 29 and reservoir 27 by way of lower reservoir chamber 43 in response to a signal from controller 15. Since damper 20 is to respond to the control in real time to control wheel as well as body movements, valve 46 must be capable of moving between its closed and open positions at a frequency significantly greater than the resonant wheel (unsprung mass) vibration frequency: at least twice this frequency an preferably higher. For example, a typical resonant wheel vibration frequency is 12 Hz. Thus, for the best control, the valve of damper 20 should respond at least up to 24 Hz and preferably up to 30–50 Hz. A valve suitable for use as valve 46 is a solenoid cartridge valve such as the Waterman Hydraulics (R) Series 12, a normally closed valve with a 5 gpm capability.

Piston 32 contains standard shock piston valve and orifice apparatus 47 including one or more throttling orifices, a rebound blowoff valve and a compression check valve. Inner closure cap 42 contains standard shock base valve apparatus 48 including one or more throttling orifices, a compression blowoff valve and a rebound check valve. These valves and orifices provide compression and rebound damping force characteristics in the normal manner well known in the prior art of shocks and struts for motor vehicles and, with bypass valve apparatus 46 closed to prevent direct communication between annular passage 29 and reservoir 27, produce the high damping force curve 22 of FIG. 3. Typically, in extension or rebound, upward movement of piston 32 causes throttled flow through the orifices and, at high velocity, the blowoff valve of piston 32. This flow is equal to the decrease in the annular volume of upper chamber 30; and a flow equal to the displaced rod (38) volume is drawn into lower chamber 31 from reservoir 27 in a relatively unrestricted manner through the check valve of base valve apparatus 48. Likewise, in compression, downward movement of piston 32 drives fluid out of lower chamber 31 in a relatively unrestricted manner through the check valve of piston valve and orifice apparatus 47. This flow is equal to the increase in the annular volume of upper chamber 30; but the volume of lower chamber 30 is further decreasing by the displaced rod (38) volume. Therefore, a throttled flow equal to the displaced rod volume is driven out of lower chamber 30 through the orifices and, at high velocity, the blowoff valve of base valve apparatus 48.

With bypass valve apparatus 46 open to allow direct communication between annular passage 29 and reservoir 27, however, the apparatus will produce the low damping force curve 21 of FIG. 3. In extension, the displaced fluid from upper chamber 30 finds a comparatively unrestricted flow path through the open valve of apparatus 46 into reservoir 27; and the full increase in volume of lower chamber 30 flows relatively unrestricted from reservoir 27 through the check valve of base valve assembly 48 into lower chamber 30. In compression, a fluid flow equal to the the full decrease in volume of lower chamber 31 finds relatively unrestricted passage through the check valve of piston valve and orifice assembly 47; and a flow equal to the displaced rod (38) volume finds relatively unrestricted passage from upper chamber 30 through the open valve of apparatus 46 into reservoir 27.

Figure 4:
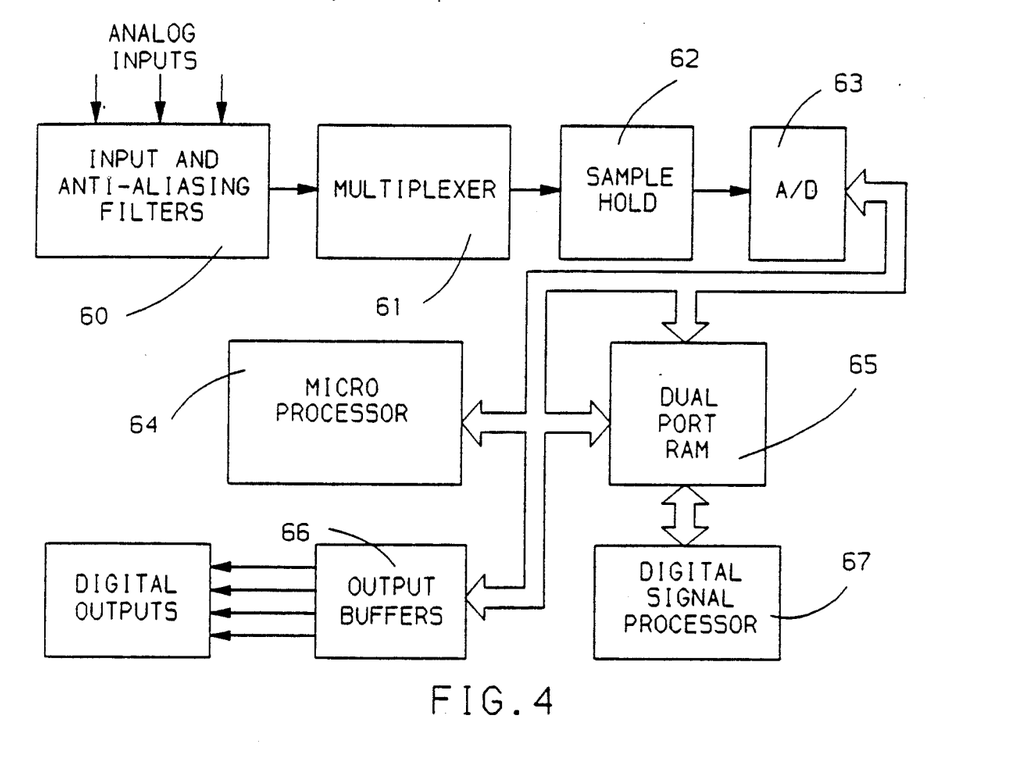
FIG. 4 is a block diagram of a controller for use in the suspension control of the vehicle of FIG. 1.

The hardware configuration of controller 15 is shown in schematic and block diagram form in FIG. 4. The analog inputs from sensors 13, 16, and 17-19 are processed in input apparatus 60, which includes sensor interface circuitry, anti-aliasing filters and any additional analog signal processing such as the differentiating of the relative position signals from sensors 13 to form relative velocity signals. The integration of the body corner acceleration signals from sensors 16 may also be performed in this circuitry but is preferably performed in software within the digital circuitry to be described.

With regard to the input signals, it should be noted that the control has been found to work well, at least in the case of an on/off damping actuator such as damper 20, with a loop frequency of 1 KHz, which means that, to avoid aliasing distortion, the input signals should be low pass filtered to avoid any significant input signals at frequencies above 500 Hz. The differentiator, especially, needs to be designed with care, since differentiation, by nature, accentuates the high frequencies in the signal and heavy filtering tends to introduce phase delays which can slow system response.

The processed and filtered input signals are read into the system by a multiplexer 61, which provides each signal, in turn, to a sample/hold apparatus 62 and an analog/digital (A/D) converter 63. The signals can be pipelined through this portion of the apparatus to speed data read-in. The output of the A/D apparatus is provided to an eight bit data bus connected also to a microprocessor 64, RAM 65 and output buffers 66. A separate 16 bit data bus connects dual port RAM 65 to a digital signal processor (DSP) 67. Microprocessor 64, which may, for example, be one of the 68HC11 family made by the Motorola (R) Corporation, contains the basic system operating software and controls the data handling and decision making tasks of the control; while DSP 67, which may be a TMS320C15 or TMS320C17 made by Texas Instruments (R) Corporation, is optimized for mathematical computations such as multiplication, which would greatly slow down a general purpose microprocessor. Such multiplications are used both in the solution of the control equations and in a digital integration routine. The output buffers 66 interface the digital processing apparatus with the actuators of the suspension apparatus 12 and may further include digital low pass filtering to prevent output of signals at frequencies higher than those to which the actuators need respond. For the embodiment shown, output buffers 66 need only be digital buffers, since the output control signals to the actuators are single bit digital signals selecting high or low damping. In a continuous active or semi-active system, however, suitable digital/analog conversion apparatus would be inserted before the output buffers. The apparatus shown is that used for the original reduction to practice of the system described herein; and a more complete description can be found in the paper "Dual Processor Automotive Controller" by Kamal N. Majeed, published in the proceedings of the IEEE/Applications of Automotive Electronics, Dearborn, MI, Oct. 19, 1988. However, cost savings may be achieved in a mass produced system by the replacement of the dual port RAM 65 with ordinary RAM and the use of a software controlled interface bus between the microprocessor and DSP and a three line serial interface for input and output, as known to those skilled in the art of microcomputer system design.

Figure 5:
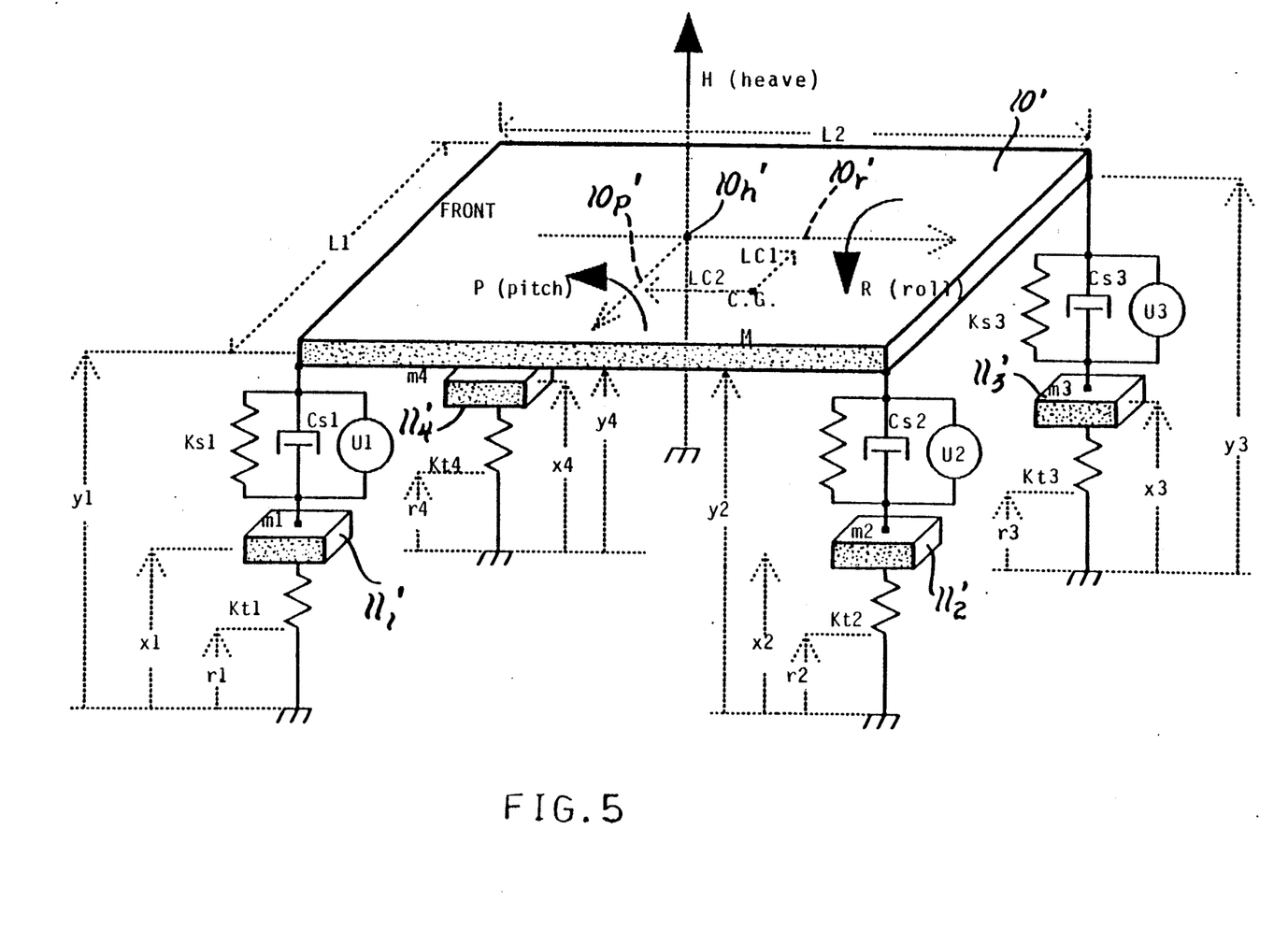
FIG. 5 shows a model of the vehicle of FIG. 1 useful in understanding the suspension control of the vehicle of FIG. 1.

The control implemented in controller 15 may be understood with reference to the model shown in FIG. 5 and the flow charts of FIGS. 6-10. Referring to FIG. 5, a vehicle body or sprung mass 10' with a mass M is an idealized model of body 10 shown in FIG. 1. Movement of vehicle body 10' is defined with respect to a point $10h'$ and axes $10p'$ and $10r'$. Vertical movement of point $10h'$ is defined as heave H. Rotational movement of body 10' about axis $10r'$, which passes through point $10h'$ and is aligned front to rear with respect to body 10' is defined as roll R. Rotational movement of body 10' about axis $10p'$, which passes through point $10h'$ and is aligned right side to left side with respect to body 10', perpendicular to axis $10r'$, is defined as pitch P.

At each corner of body 10', an unsprung mass $11_i$, (i = 1, 2, 3, 4), which is an idealized model of wheel 11 of FIG. 1 (in combination with the other elements contributing to the unsprung mass) and has a mass $m_i$, is related to the ground through a spring constant $k_{ti}$, representing the tire spring force, and to the adjacent corner of body 10' by a spring constant $k_{si}$ representing the suspension spring force, a damping constant $c_{si}$ representing the suspension damper and an external actuator force $U_i$, where i = 1, 2, 3, 4 for the four corners. The position of each unsprung mass $11_i$, with respect to an inertial reference frame is $x_i$; and the position of the adjacent corner of body 10' with respect to the same reference is $y_i$. FIG. 5 also shows the position $r_i$ of the road at each unsprung mass $11_i$, with respect to the same inertial reference frame. The effective length $L_2$ of body 10 is the distance parallel to axis $10r'$ between supporting points of front and rear unsprung masses on the same side of body 10. Similarly, the effective width $L_1$ of body 10 is the distance parallel to axis $10p'$ between supporting points of corresponding left and right unsprung masses.

A seven degree of freedom vehicle model requires 14 states, which may be chosen as six body states, including the heave, roll and pitch positions and velocities (H, R, P, Hdot, Rdot, Pdot) and, for each suspension point, wheel position and velocity ($x_i$, $x_i$dot). Hdot, Rdot, Pdot, $x_i$dot and any variable in this specification including the word "dot" refer to the derivative of that variable with respect to time, which is generally denoted in the prior art of suspension controls with a dot over the variable name. Thus, Hdot is heave velocity, etc.

The control, however, does not use all 14 states listed above. Rather, the control uses mainly the velocities as feedback variables and, in the semi-active case, only the velocities. The control law for the force on each wheel (i = 1, 2, 3, 4), in the case of a fully active suspension, is:

$$F_i = G_{di}D_i + G_{wi}x_idot + G_{hi}Hdot + G_{ri}Rdot + G_{pi}Pdot,$$

wherein $D_i$ is the suspension displacement ($y_i - x_i$), $x_idot$ is the wheel velocity, $Hdot$ is the heave velocity, $Rdot$ is the roll velocity, $Pdot$ is the pitch velocity and $G_{di}$, $G_{wi}$, $G_{hi}$, $G_{ri}$ and $G_{pi}$ are the gains for the contribution of the respective state variables to the force $F_i$. For a semi-active suspension control, with actuators that provide only a damping force, the first term may be eliminated, since it corresponds to a dominant part of the active power required. The control law for a semi-active control is thus:

$$F_i = G_{wi}x_idot + G_{hi}Hdot + G_{ri}Rdot + G_{pi}Pdot.$$

The control thus combines a local state variable indicative of wheel velocity with centralized state variables indicative of body velocities in the most relevant three modes of heave, roll and pitch and, only in the case of a fully active suspension control, a state variable indicative of suspension displacement, which might be used to control the resonant vibration frequencies of the suspension apparatus (especially to allow lowering the body mode frequency from 1 Hz to about 0.3 Hz or, more realistically, 0.6 Hz). With this control, the desired force between the body and each wheel is essentially independent of the velocities of the other wheels, which provides local control of wheel hop or vibration. In addition, the contributions of body velocities are separated into heave, roll and pitch modes to assist precise tuning of the suspension for body as well as wheel movement.

Another version of the control may be expressed in the following equation:

$$F_i = G_{wi}x_idot + sum[G_{yi}y_idot],$$

wherein the first term is identical to the wheel velocity term in the previous equation but the heave, roll and pitch velocity terms of the original equation have been replaced by a linear combination of body corner velocities $y_idot$, using gains $G_{yi}$. For an absolutely rigid vehicle body, three of the four body corner velocities would be sufficient to provide and equivalent for roll, pitch and heave velocities. However, since no vehicle body is absolutely rigid, more accuracy will be obtained by using all four body corner velocities. In addition, it would be possible to use only two diagonal body corner velocities in a control system with an additional reduction in accuracy. It will be seen at a later point in this description that the heave, roll and pitch velocities may be mathematically computed from the body corner velocities.

For the semi-active control, the use of only velocity feedback results in the demand power being mostly dissipative (90 percent of the time), due to the phasor relationships involved. The control is thus naturally well suited to a semi-active suspension control such as that of this embodiment. In practice, it is found that the system provides excellent control of suspension movement without introducing the phase lag and inaccuracy problems of a Kalman filter or Luenberger observer to estimate non-measured states. In addition, the reduced need for processing throughput due to the absence of such filters or observers results in faster processing times and reduced cost in the processor hardware.

Figure 8:
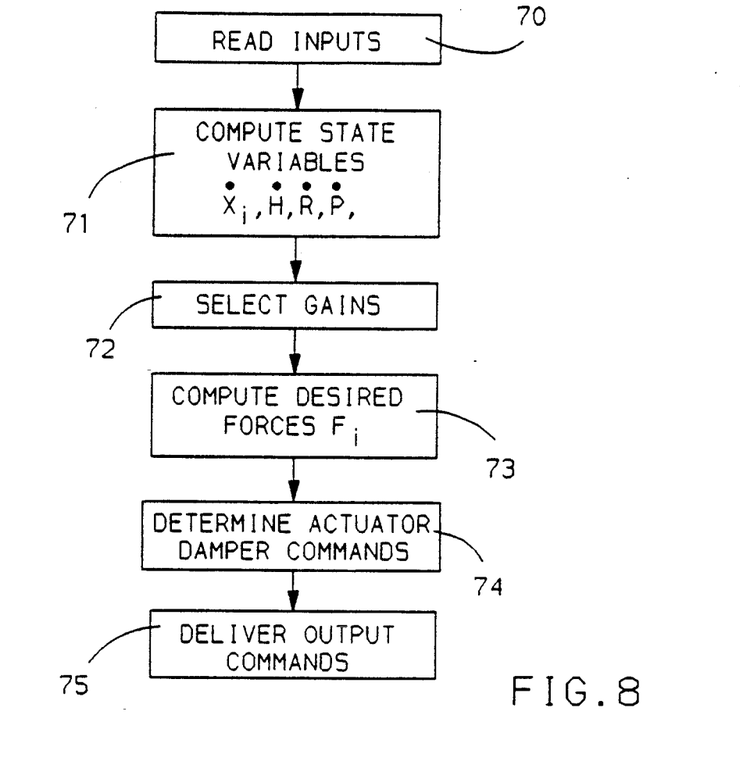

Referring to FIG. 8, the main control sequence provides for the reading of inputs (70), followed by the derivation of state variables (71). The state variables $x_idot$, $Hdot$, $Rdot$ and $Pdot$ are derived from the sensed inputs as follows. The input signal from acceleration sensor 16 at a particular suspension point or corner of the vehicle is integrated to provide the vertical body corner velocity $y_idot$. The input signal from the relative suspension displacement sensor 13 at that corner of the vehicle is differentiated to provide the relative body/-wheel vertical velocity $y_idot$-$x_idot$. The difference between the vertical body corner velocity $y_idot$ and the relative body/wheel velocity $y_idot$-$x_idot$ yields the vertical wheel velocity $x_idot$ at that corner of the vehicle. It should be noted that both the vertical body corner velocity $y_idot$ and the vertical wheel velocity $x_idot$ are absolute velocities, referenced to an intertial reference frame and not to the road. The heave, roll and pitch velocities $Hdot$, $Rdot$ and $Pdot$ are derived from the vertical body corner velocities $y_idot$ at the four corners of the vehicle according to the following equations, wherein all variables are velocities:

$$Hdot = (\tfrac{1}{4})y_1dot + (\tfrac{1}{4})y_2dot + (\tfrac{1}{4})y_3dot + (\tfrac{1}{4})y_4dot,$$

$$Rdot = -(\tfrac{1}{2})(1/L_1)y_1dot - (\tfrac{1}{2})(1/L_1)y_2dot + (\tfrac{1}{2})(1/L_1)y_3dot + (\tfrac{1}{2})(1/L_1)y_4dot,$$

$$Pdot = -(\tfrac{1}{2})(1/L_2)y_1dot + (\tfrac{1}{2})(1/L_2)y_2dot + (\tfrac{1}{2})(1/L_2)y_3dot - (\tfrac{1}{2})(1/L_2)y_4dot.$$

Continuing with the flow chart of FIG. 8, the loop next selects system gains. Since no vehicle suspension can simultaneously maximize all aspects of vehicle ride and handling, the gains $G_{wi}$, $G_{hi}$, $G_{ri}$ and $G_{pi}$ are ordinarily computed during system development for a particular desired suspension behavior. For example, one set of gains for a particular vehicle may emphasize wheel control for maximum tire traction on rough road surfaces; whereas a different set of gains may emphasize body movement and attitude control during vehicle cornering or braking. Yet another possibility is a set of gains which produces a very soft, comfortable ride when the road surface is comparatively smooth, with only small amplitude, high frequency road input to the suspension. The control allows a great deal of flexibility in tailoring the "best" suspension behavior for appeal to a particular vehicle operator. However, since the suspension behavior is entirely software definable, one of the advantages of this system is the ease with which suspension performance may be modified in real time merely by the substitution of one set of gains for another in the control equations.

Figure 6:
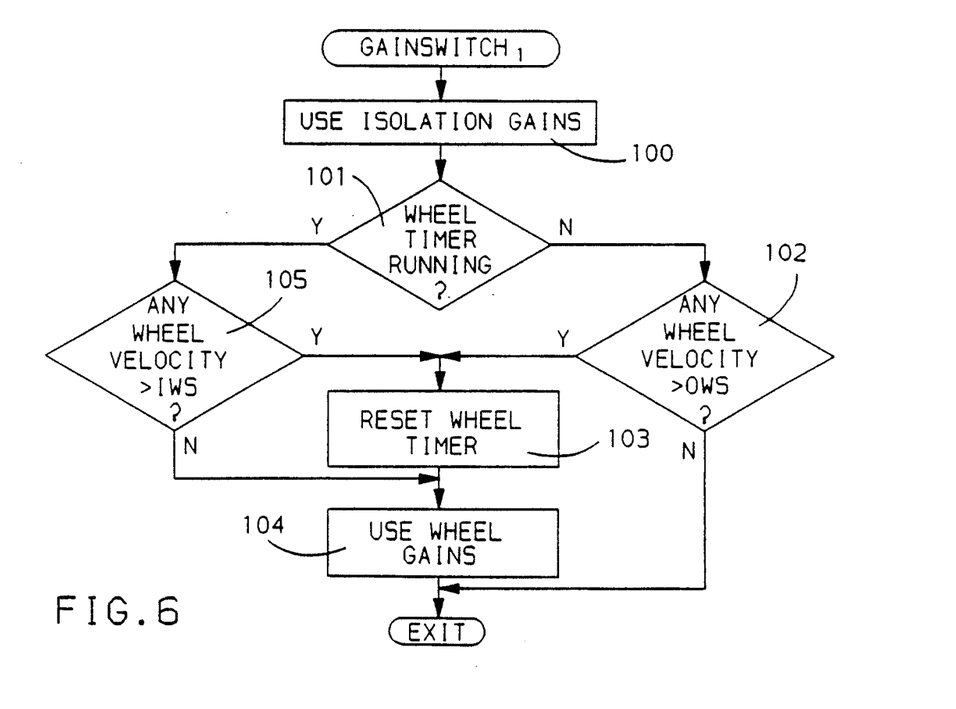
FIGS. 6–10 show flow charts illustrating the operation of the suspension control for the vehicle of FIG. 1.

A simple example of such gain switching is shown in the flow chart of FIG. 6. In this example, two sets of gains are stored permanently in system memory: (1) a set of isolation gains known to produce a soft ride for maximum comfort; and (2) a set of wheel gains known to produce maximum wheel hop control for traction on washboard and other rough road surfaces which excite the wheel at its resonant vibration frequency. The flow chart of FIG. 6 shows GAINSWITCH1 (elements 100–105), which is a portion of the control program that determines which set of gains will be used in the calculation of desired wheel forces. GAINSWITCH1 basically chooses isolation gains except when a wheel velocity becomes sufficiently large to indicate the need for wheel gains to control wheel motion. GAINSWITCH1 uses a wheel timer, which may be a RAM location reset by the insertion of a predetermined integer such as 4 and decremented once each loop cycle, to command use of wheel gains, once chosen, for a predetermined minimum time and to indicate, during each successive cycle of the control program, whether such wheel gains have been in use.

GAINSWITCH1 starts by assuming a default set of isolation gains (100). If the wheel timer is not running (101) and the velocities $x_i$dot of all wheels are within an outer wheel switchband OWS (102), the default isolation gains are retained as the chosen gains. If the wheel timer is not running (101) but the velocity of any wheel is outside the outer wheel switchband OWS (102), the wheel timer is reset (103) and the set of wheel gains is chosen (104) in place of isolation gains.

The system provides hysteresis, so that, once a wheel velocity goes outside the outer wheel switchband OWS, all wheel velocities must go within an inner wheel switchband IWS before isolation gains are resumed. In addition, there is a time delay before the resumption of isolation gains even after all wheel velocities go within the inner wheel switchband IWS. Thus, if the wheel timer is running (101) and any wheel velocity is outside the inner wheel switchband (105), the wheel timer is reset (103) and the wheel gains are chosen. If the wheel timer is running (101) but all wheel velocities are within the inner wheel switchband (105), the wheel gains are chosen (104) but the timer is not reset and is thus allowed to be decremented. Therefore, when all wheel velocities go within the inner wheel switchband IWS, the wheel gains will still be used for the wheel timer period before isolation gains are resumed.

Figure 7:
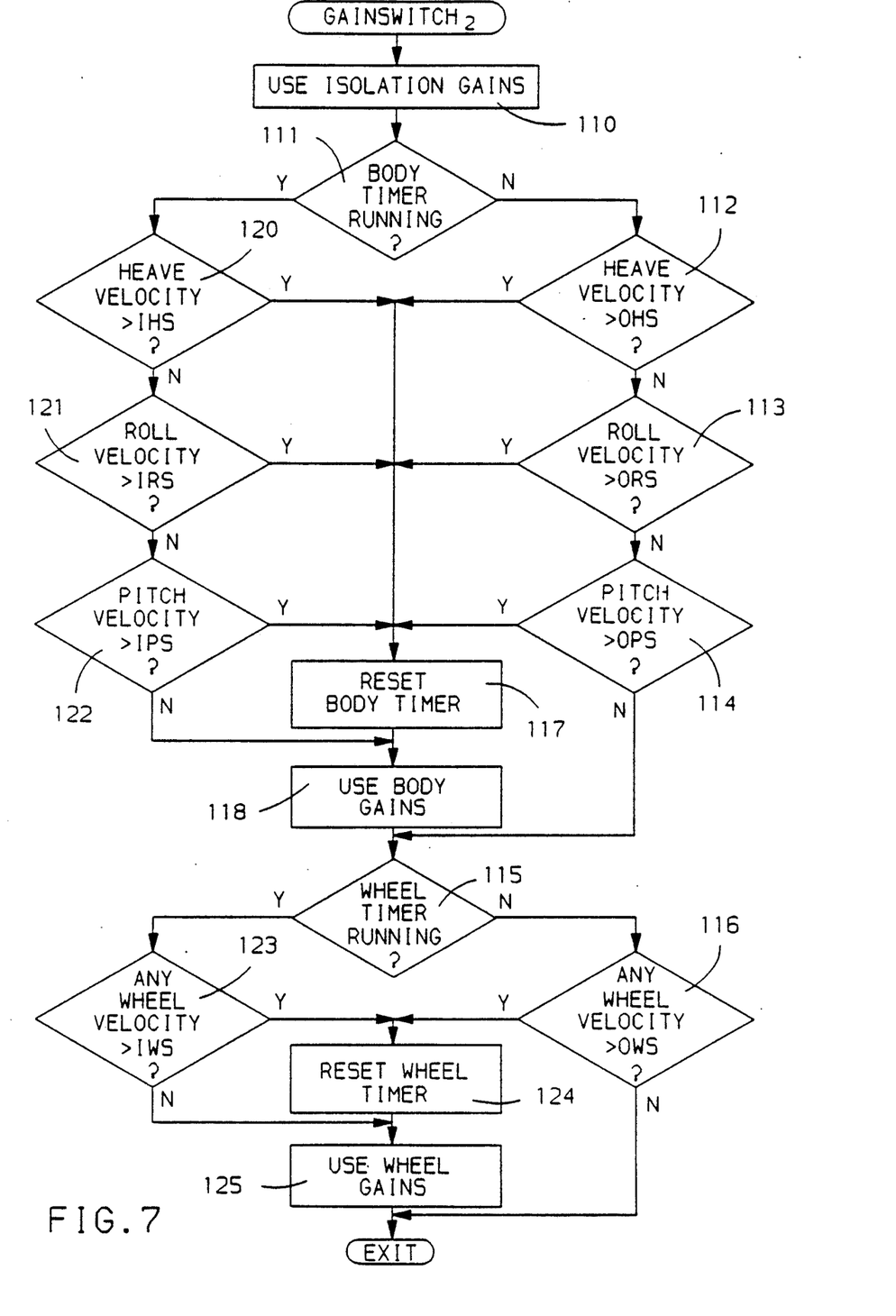

A more complex procedure is shown in FIG. 7, in which a set of body gains is added to provide maximum body attitude control when large body velocities are detected. Flowchart GAINSWITCH2 (elements 110-125) of FIG. 7 starts by assuming a default set of isolation gains (110). The control then determines if a body timer is running (111), to check if the set of body gains is already in use. The body timer may be a RAM location used as in the example of FIG. 6. If the body timer is not running, the heave, roll and pitch velocities are compared to outer heave (112), roll (113), and pitch (114) switchband values, respectively. If they are all within these outer switchbands, the control then determines if a wheel timer, similar to the body timer, is running (115). If not, the control determines if a wheel velocity is outside an outer wheel switchband (116), as in the example of FIG. 6. If all wheel velocities are within the outer wheel switchband, this portion of the loop is exited with the isolation gains chosen.

If any of the heave, roll or pitch velocities are outside their respective outer switchband values (112, 113, 114), the body timer is restarted (117) and the body gains are chosen (118). Then, if the wheel timer is not running (115) and the wheel velocity is within its outer switchband value (116), this portion of the control loop is exited with the body set of gains chosen. If the body timer is running (111) and the heave, roll or pitch velocity is outside the respective inner heave, roll or pitch switchband, respectively (120, 121, 122), the body timer is restarted (117) and the body gains chosen (118). If the body timer is running (111) but none of the heave, roll or pitch velocities is outside its respective inner switchband (120, 121, 122), the body gains are chosen (118) without a restart of the body timer.

However, regardless of whether body or isolation gains are chosen as described in the preceding paragraph, if the wheel timer is running (115) or any wheel velocity is outside the outer wheel switchband OWS (116), the wheel gains will be chosen over body or isolation gains in a manner similar to that described in the example of FIG. 6. If the wheel timer is not running (115) but a wheel velocity is outside the outer wheel switchband OWS (116), or if the wheel timer is running (115) and any wheel velocity exceeds the inner wheel switchband IWS (123), the wheel timer is restarted (124) and wheel gains are chosen (125). If the wheel timer is running (115) but no wheel velocity exceeds the inner wheel switchband IWS (123), wheel gains are chosen without restart of the wheel timer, which allows the wheel timer to be decremented.

In the example of FIG. 7, the body and wheel timers are operated independently of each other but in a similar manner. Wheel gains, when chosen, always take the highest priority; and body gains, chosen in the absence of wheel gains, take priority over isolation gains. With regard to the examples of FIGS. 6 and 7, of course, other detailed embodiments with different priorities may be envisioned within the general form of the gain switching method and apparatus shown. In addition, other sensed or derived wheel or body inputs such as vertical body corner velocities or heave, roll, pitch or vertical corner accelerations, filtered, if desired, to reduce spikes and transients, may be used as decision making inputs rather than the wheel or body velocities as shown.

Referring again to FIG. 8, once the state variables computed from the input sensor signals (71) and the gains are chosen (72), the desired force $F_i$ at each corner of the vehicle may be computed by use of the control equations previously described (73). Next, the program determines the actuator commands from the desired forces $F_i$ (74) and outputs the actuator commands to the actuators. In the case of a fully active suspension, wherein an actuator is capable of providing power to the suspension, the actuator command may cause the desired force itself to be applied to the wheel at that corner of the vehicle.

Figure 9:
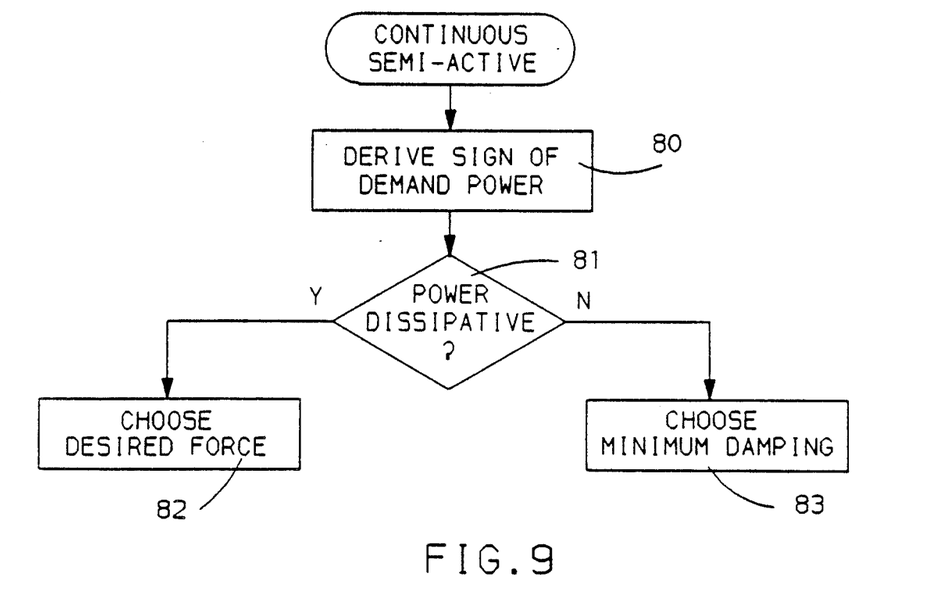
Figure 10:
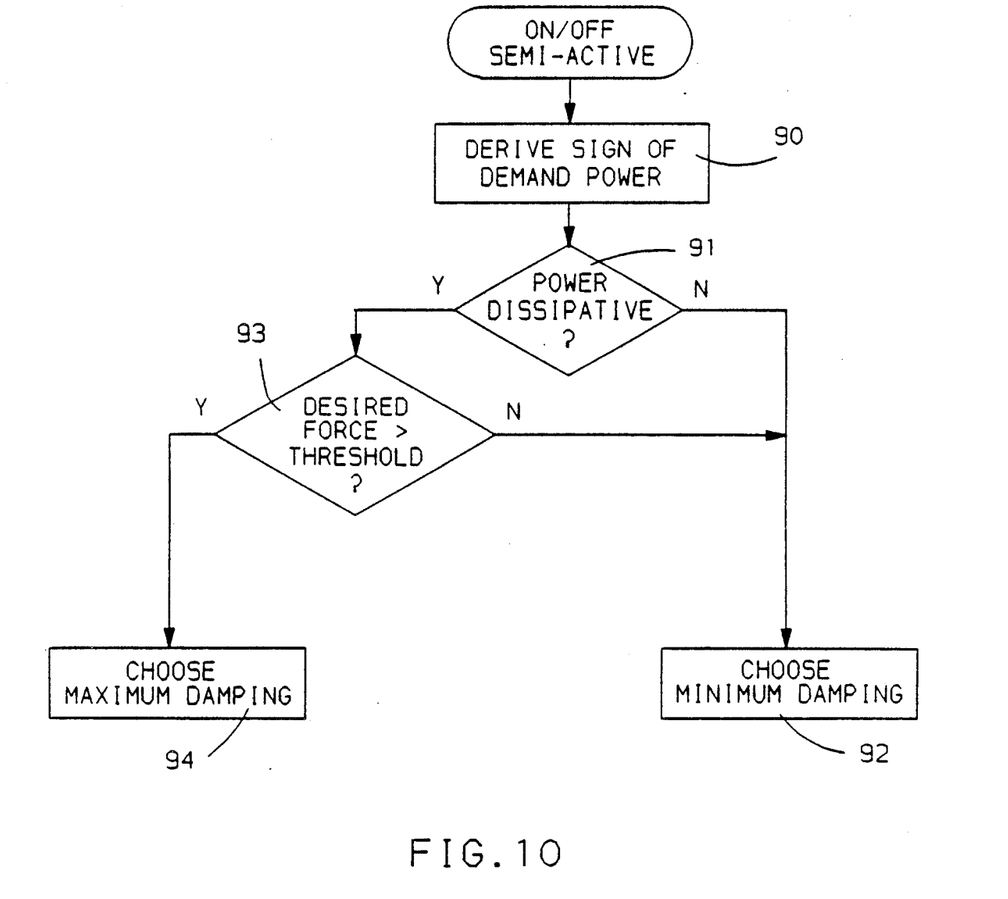

However, a damping control can apply only a damping or power dissipating force; and the system must therefore specify what to do if the desired force is active: that is, it demands power input to the suspension apparatus which a damper cannot provide. The process for a continuous semi-active (damping only) control is shown in the flow chart of FIG. 9. To determine whether the desired force, if applied, would produce dissipative or active power, the control checks the sign of the demand power. As shown in the paper "Vibration Control Using Semi-Active Force Generators" by Karnopp et al, ASME paper 73-DET-122, published 1973, the power supplied by a suspension damper is the product of the force exerted between the body and wheel and the relative velocity between the body and wheel. The sign of the power is the sign of this product, which is determined by the signs of the force and relative velocity. Thus, the sign of the demand power in the flow chart of FIG. 9 is derived from the signs of the desired force $F_i$ and the body/wheel relative velocity $y_i$dot$-x_i$dot. It is not necessary to perform any numerical multiplication: the control need only compare the signs (80, 81). If the signs are the same, the power demanded is dissipative and may be supplied by a damper. Thus, the desired force is chosen (82) and the actuator command generated accordingly. If the signs are opposite, however, the power is active and cannot be supplied by a damper. Therefore, for a continuously variable damping actuator, the control outputs to the actuator an actuator command specifying the minimum damping force (83). The minimum damping force will probably not be zero, since the actuator will provide some restriction to fluid flow even with its damping selection valve fully open. The minimum damping force may even be set to a higher non-zero value for other reasons, such as system stability or smoothness of operation.

An on/off damping control uses an actuator such as damper 20 that has a damping control valve with two positions: one creating a minimum damping force and one creating a maximum damping force. In such a system, active energy calls for the minimum damping force, as in the continuous damping force system. However, for a dissipative force, either the minimum or maximum damping force may be selected, depending on which is closest to the desired damping force $F_i$. For this purpose, a threshold curve may be defined between the minimum and maximum force curves; and the desired force $F_i$ is compared to this intermediate force. If it is greater (in absolute value) than the threshold, the maximum force is chosen; if not, the minimum force curve is chosen. Thus, as shown in the flow chart of FIG. 10, the determination of output force for such a system begins, as in the continuous damping case of FIG. 9, by first deriving the sign of demand power (90) and then determining from this sign whether the demand power is dissipative or active (91). If active, the minimum damping force is selected (92); but, if dissipative, the desired force is compared (93) with a threshold stored in memory. This threshold, represented by curve 23 in FIG. 3, may be stored as a series of points (nine, for example) in memory. For a given desired force and body/wheel relative velocity $y_i$dot$-x_i$dot, the actual threshold value is computed by interpolation between the closest two of the stored points. If the desired force exceeds the threshold, maximum damping is selected (94) for the actuator command; however, if it does not exceed the threshold, minimum damping is selected (92). This is different from the classical on/off, semi-active suspension control described by E.J. Krasnicki in "The Experimental Performance of an 'on-off' Active Damper", *Proceedings of the 51st Shock and Vibration Symposium*, San Diego, CA, Oct. 1980, in which no output force selection based on comparison with a threshold is disclosed. In the control described herein, the damping force used when the power is dissipative is not confined to the maximum damping force but is chosen to be the most appropriate of the maximum and minimum damping forces, depending on the desired force. This tends to produce reduce harshness of ride, especially on comparatively good roads, where suspension forces and accelerations are comparatively small and may thus produce a desired suspension force lower than the threshold most of the time. In addition, the threshold allows an extra degree of freedom in suspension tuning, since it allows adjustment of the average damping by changing the threshold in software without changing the maximum damping level, which is determined by the orifices and valves of the damper.

The embodiments of the invention in which an exclusive property or privilege is claimed are defined as follows:

1. Suspension apparatus for a motor vehicle having a body suspended by suspension springs at a plurality of points on unsprung, road contacting wheels, the suspension comprising, in combination:

an actuator connected to exert a variable vertical force between the vehicle body and one of the wheels in response to a control signal;

a control effective to derive the control signal for the actuator from a linear combination of vehicle state variables derived from sensed vehicle variables, the linear combination being characterized by gains determining the relative contribution of each state variable to the control signal;

memory means storing a plurality of alternative sets of gains for use in deriving the control signal, each stored set of gains comprising gain values tending to produce a different suspension performance; and the control having means responsive to one of the sensed vehicle variables in real time to select between the alternative sets of gains in deriving the control signal.

2. The suspension apparatus of claim 1 in which the vehicle state variables are a vertical wheel velocity of the corresponding wheel and one or more body related variables.

3. The suspension apparatus of claim 2 in which the one or more vehicle body related variables are body heave, roll and pitch velocities.

4. The suspension apparatus of claim 2 in which the memory stores a set of isolation gains emphasizing minimization of vehicle body motions for a comfortable ride quality and a set of wheel gains emphasizing minimization of vertical wheel motion and the control comprises means responsive to the vertical wheel velocity to select the set of wheel gains when vertical wheel velocity exceeds a wheel velocity reference and, during at least some modes of vehicle operation when the wheel velocity does not exceed the wheel velocity reference, to select the set of isolation gains.

5. The suspension apparatus of claim 2 in which the memory stores a set of body gains emphasizing maintenance of body attitude and a set of wheel gains emphasizing minimization of vertical wheel motion and the control comprises means responsive to the vertical wheel velocity to select the set of wheel gains when vertical wheel velocity exceeds a wheel velocity reference and, during at least some modes of vehicle operation when the wheel velocity does not exceed the wheel velocity reference, to select the set of body gains.

6. The suspension apparatus of claim 5 in which the memory further stores a set of isolation gains emphasizing minimization of vehicle body motions for a comfortable ride quality and the control selects the set of isolation gains during at least some modes of vehicle operation when the sensed body velocity does not exceed the body velocity reference and the sensed wheel velocity does not exceed the wheel velocity reference.

7. The suspension apparatus of claim 2 in which the control selects a first set of gains emphasizing control of the one of the sensed vehicle variables when the one of the sensed vehicle variables exceeds a first predetermined reference and, in at least some modes of vehicle operation when the one of the sensed vehicle variables does not exceed a second predetermined reference less than the first predetermined reference, selects a second set of gains.

* * * * *